(12) United States Patent
Guigo

(10) Patent No.: US 7,240,454 B2
(45) Date of Patent: Jul. 10, 2007

(54) HOOK STABILIZING DEVICE FOR A FISHING LURE

(75) Inventor: Philippe Guigo, Discovery Bay (HK)

(73) Assignee: Normark Corporation, Minnetonka, MN (US)

( * ) Notice: Subject to any disclaimer, the term of this patent is extended or adjusted under 35 U.S.C. 154(b) by 5 days.

(21) Appl. No.: 11/330,031

(22) Filed: Jan. 11, 2006

(65) Prior Publication Data

US 2006/0260179 A1 Nov. 23, 2006

Related U.S. Application Data

(63) Continuation-in-part of application No. 11/134,893, filed on May 23, 2005.

(51) Int. Cl.
*A01K 83/00* (2006.01)

(52) U.S. Cl. ........................ 43/42.36; 43/44.9

(58) Field of Classification Search ............... 43/42.36, 43/44.9, 44.91, 42.15
See application file for complete search history.

(56) References Cited

U.S. PATENT DOCUMENTS

| 1,582,713 | A | | 4/1926 | Welch |
| 1,688,110 | A | | 10/1928 | Bogart |
| 1,754,567 | A | | 4/1930 | Newell |
| 2,515,591 | A | | 7/1950 | Clink |
| 2,617,226 | A | | 11/1952 | Yoshii |
| 2,915,845 | A | * | 12/1959 | Hughes ...................... 43/17.2 |
| 3,426,467 | A | | 2/1969 | Bryant |
| 4,139,963 | A | | 2/1979 | Ingram |
| 4,803,798 | A | * | 2/1989 | Hannah ..................... 43/43.13 |
| 4,907,364 | A | | 3/1990 | Hedman |
| 4,914,851 | A | | 4/1990 | Acker |
| 4,922,646 | A | * | 5/1990 | Basgal ...................... 43/42.33 |
| 5,020,266 | A | | 6/1991 | Williamson |
| D319,281 | S | | 8/1991 | Williamson |
| 5,090,151 | A | * | 2/1992 | Salminen ................... 43/42.05 |
| 5,261,181 | A | | 11/1993 | Melton |
| 5,383,695 | A | | 1/1995 | Couper |
| 5,560,142 | A | * | 10/1996 | Dickens ..................... 43/42.34 |
| 5,806,234 | A | | 9/1998 | Nichols |
| 5,813,366 | A | * | 9/1998 | Mauldin, Jr. ................ 119/710 |
| 5,855,089 | A | | 1/1999 | Hockmeyer et al. |
| 5,884,430 | A | | 3/1999 | Livingston |
| 5,904,001 | A | | 5/1999 | Rabideau |
| 6,711,848 | B1 | | 3/2004 | Gammieri |
| 6,718,683 | B2 | | 4/2004 | Hawkins |
| 6,735,898 | B2 | | 5/2004 | Luke |
| 6,922,939 | B2 | | 8/2005 | Moorhouse |

FOREIGN PATENT DOCUMENTS

WO WO 03067975 8/2003

* cited by examiner

*Primary Examiner*—Kimberly S. Smith
(74) *Attorney, Agent, or Firm*—Dority & Manning, P.A.

(57) ABSTRACT

A fishing lure is generally provided that incorporates a hook stabilizing device that substantially holds the hook in place and hinder the hook from rotating while the lure is being fished. The hook stabilizing device is configured to accept the connection a fishing line to a hook, such as a crimp connection to an eyelet of a hook. Free rotation of the hook may be allowed after a fish is hooked when the connection of the line to the hook is removed from the hook stabilizing device while fighting the hooked fish.

14 Claims, 4 Drawing Sheets

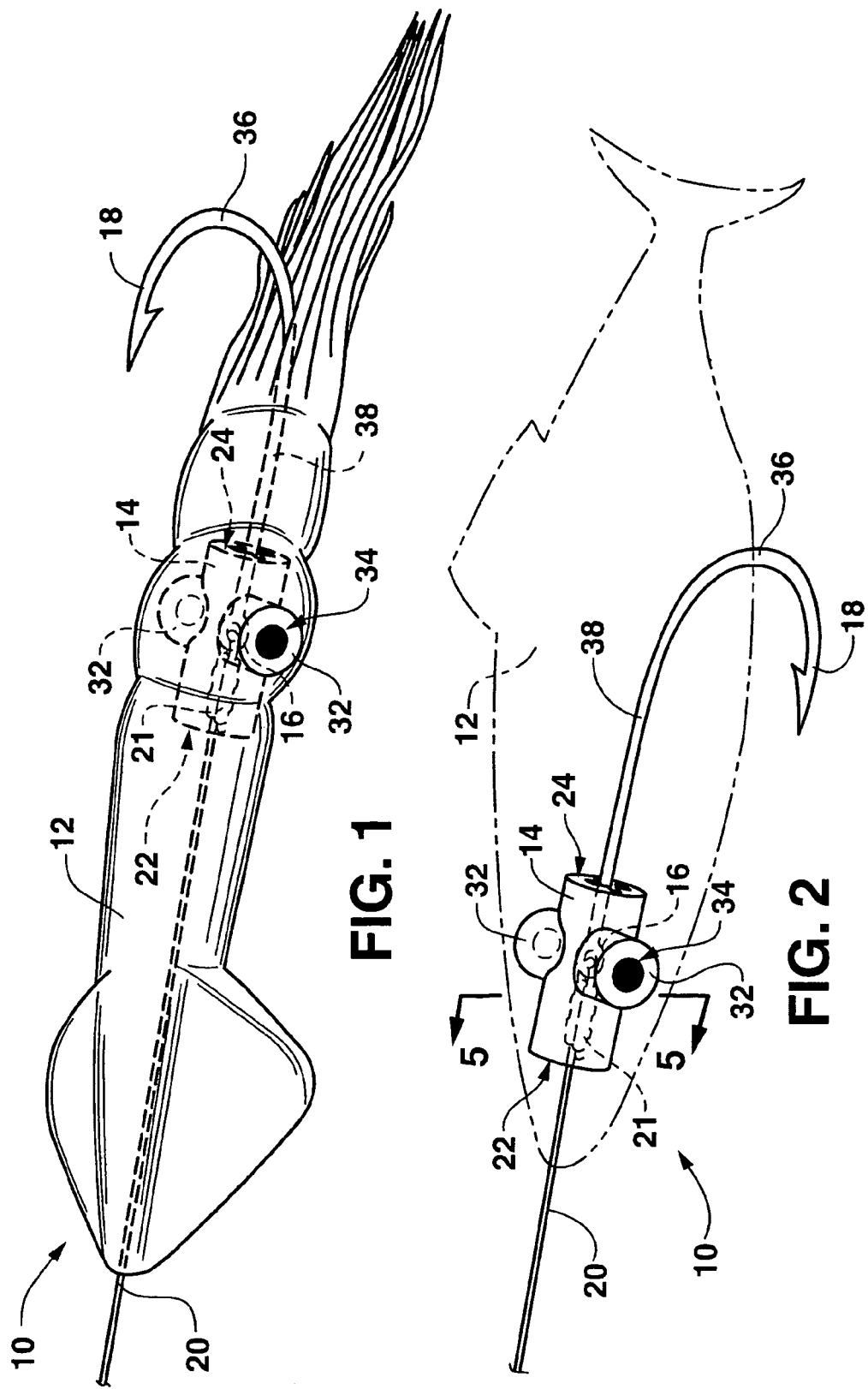

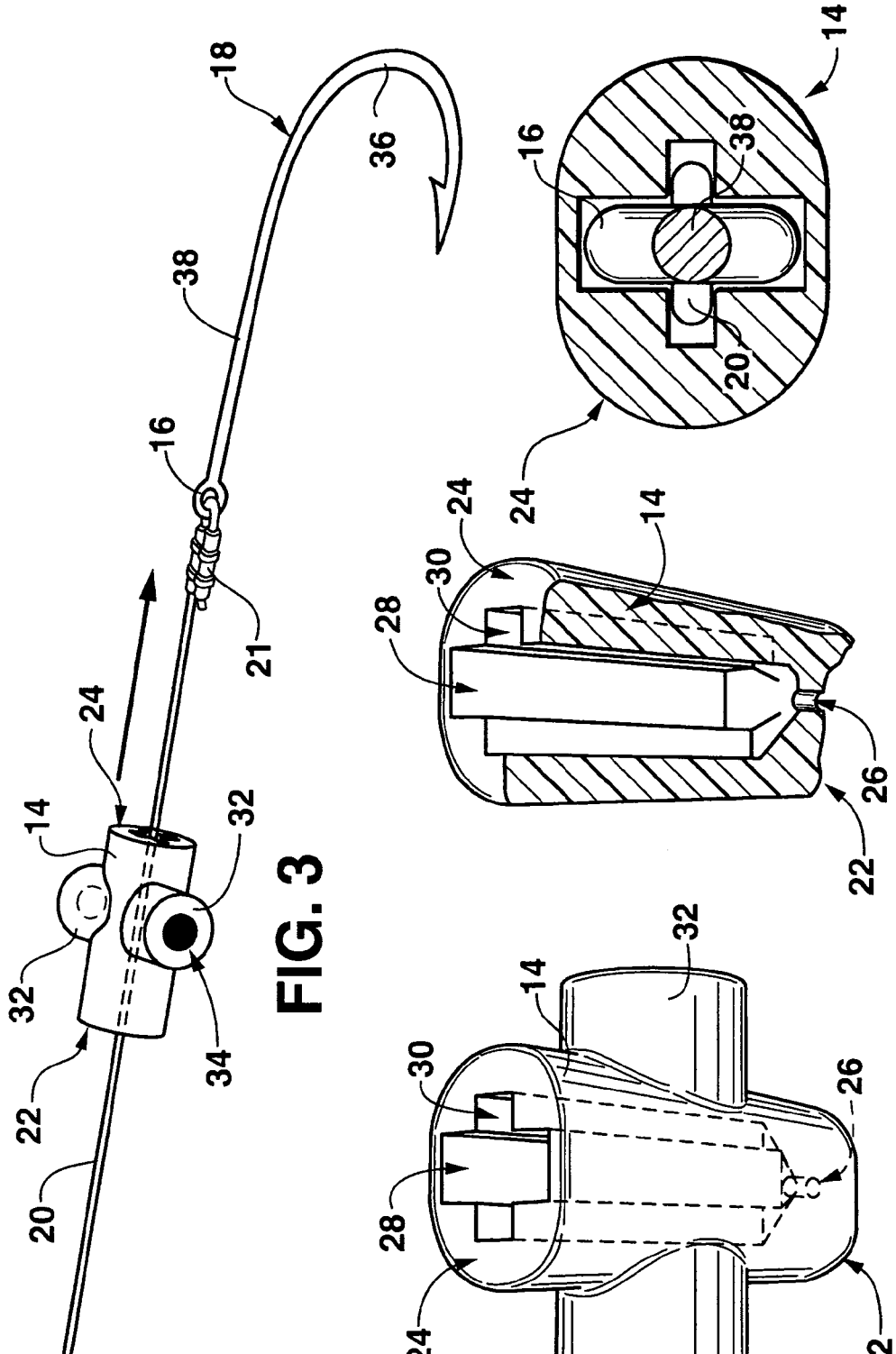

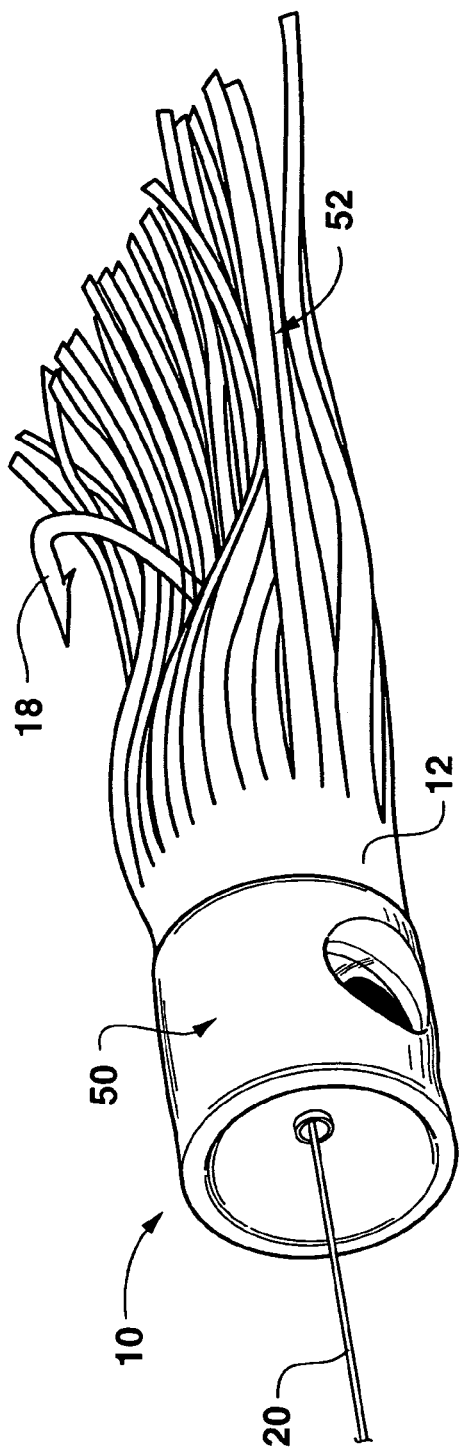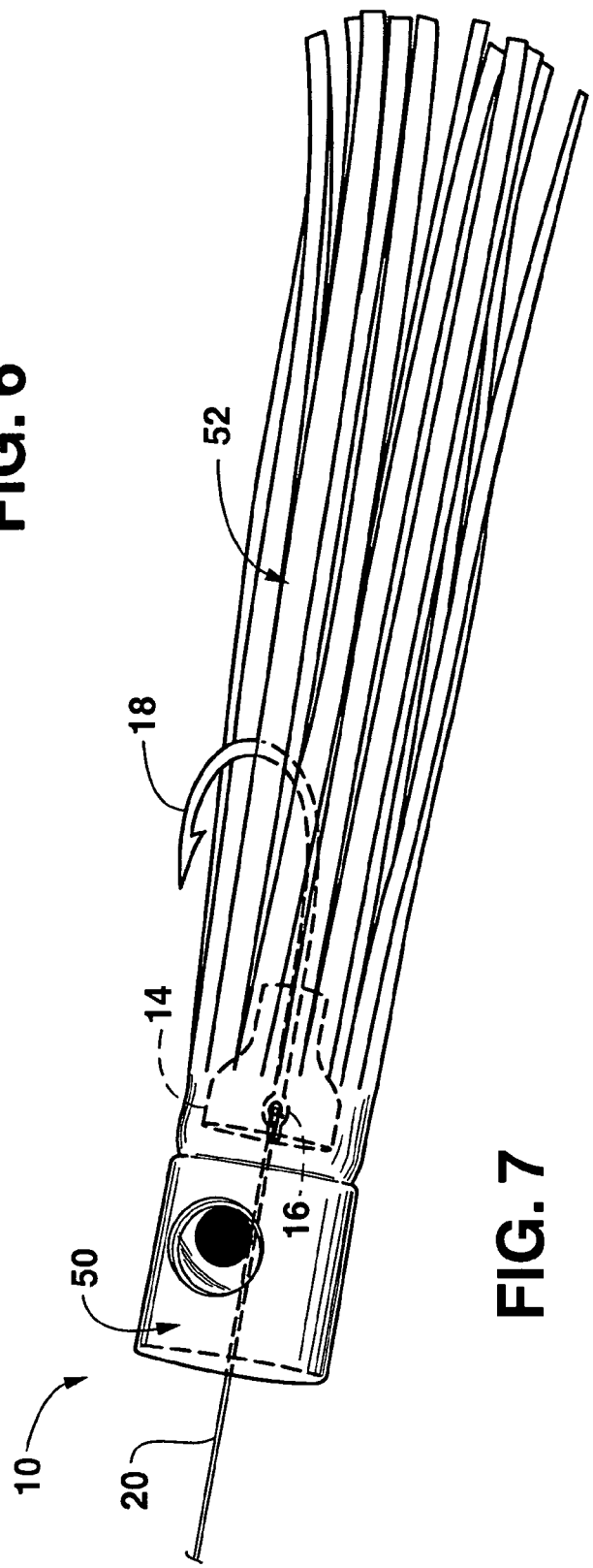

HOOK STABILIZING DEVICE FOR A FISHING LURE

PRIORITY INFORMATION

This application is a continuation-in-part of and claims priority to U.S. Pat. application Ser. No. 11/134,893 filed on May 23, 2005, and entitled "Hook Stabilizing Device for a Fishing Lure," which is hereby incorporated by reference in its entirety.

TECHNICAL FIELD OF THE INVENTION

The present invention relates to fishing lures. More specifically, the present invention relates to fishing lures incorporating a hook stabilizing device that substantially holds the hook in place by hindering rotation of the hook eyelet. However, the hook stabilizing device can allow the lure to move up the fishing line when fighting a fish, which allows the hook to rotate freely.

BACKGROUND OF THE INVENTION

Sport fishing is enjoyed around the world. From fresh water to salt water, a wide variety of fish species exist. Fishermen employ a variety of equipment and tackle depending upon the water being fished, the time of day, the species of fish sought, personal choice, and many other factors. A fishing lure, sometimes referred to as an artificial lure, is frequently a part of such equipment and tackle.

Fishing lures are typically designed and decorated with the goal of replicating or mimicking the movement and appearance of a food source for the particular fish being sought. For example, such lure may take on the shape of a minnow, tadpole, frog, mouse, insect, salamander, another fish, or such other food source. The fisherman's hope is that by having a lure closely resembling or acting like a source of food, fish will be enticed into biting the lure.

In an effort to make the lure aesthetically realistic, a designer can use materials pigmented with the desired colors. For example, colored plastics or rubber may be used. In addition, a designer can paint or stain the external surface of the lure to achieve the desired color and marking characteristics. Decorative features such as scales, eyes, and fins may be painted onto the surface or otherwise added to the lure.

Lures can also be designed with features that make the lure realistic in a functional manner. Fins, diving planes, spinners, rattles and the like may be added in order to make the lure move and sound like a food source. Some lures may be specifically designed to operate on the water surface while others may function only when below.

Typically, fishing lures are designed to incorporate at least one hook somewhere within or attached to the fishing lure. In some lures, it may be desired that the hook not rotate or move freely with respect to the lure so as to prevent the hook from excessive movement that may discourage a targeted fish from striking the lure. Also, by preventing the hook from rotating freely with respect to the lure body, the hook can stay in the desired position and angle to better ensure that a striking fish will be hooked. Furthermore, in embodiments where the leader line is connected directly to the hook, preventing the hook from rotating will prevent build up of unwanted twist in the leader line and the fishing line. However, controlling the movement of the hook relative to the lure is difficult, especially when the hook is attached to a fishing line that extends through the lure body and out the back or bottom of the body. Typically, the lure does not prevent the hook from rotating or moving freely with respect to the lure body.

Also, it may be desired to have the lure body move away from the hook, up the fishing line toward the fisherman, while fighting a hooked fish. This movement allows the hook to rotate freely with the hooked fish's movement, while preventing the lure body from dislodging the hook out of the fish's mouth.

As such, a need exists for a device that prevents the hook from rotating freely with respect to the lure while being fished, but still enables the hook to rotate freely when fighting a hooked fish.

BRIEF SUMMARY OF THE INVENTION

Objects and advantages of the invention will be set forth in part in the following description, or may be obvious from the description, or may be learned through practice of the invention.

Generally, in one embodiment, the present invention is directed to an internal member configured to be inserted inside a fishing lure and to accept a leader line attached to an eyelet of a fishing hook. The internal member comprises a first end and a second end. The first end is configured to receive the leader line. The second end is configured to receive the eyelet of the fishing hook. The internal member defines a star-shaped aperture that extends through the internal member from the first end to the second end to hinder rotation of the eyelet of the hook.

In one embodiment, the star-shaped aperture has at least 4 outer points, such as at least 6 outer points. In one embodiment, for instance, the star shaped aperture can have 8 outer points. Also, the star-shaped aperture can be symmetrical throughout the length of the internal member.

In another embodiment, the present invention is generally directed to a fishing lure rig assembly attached to a leader line. The fishing lure rig assembly comprises a hook, a structural member, and a lure body substantially surrounding the structural member. The hook defines an eyelet that is connected to the leader line. The structural member defines a first end, a second end, and a star-shaped aperture that extends through the structural member from the first end to the second end. The star-shaped aperture hinders the eyelet from rotating freely.

In yet another embodiment, the present invention is generally directed to a fishing lure configured for connection to a fishing line comprising a lure body, a hook, and a hook stabilizing device. The lure body defines a head section where the fishing line enters the lure body. The hook defines an eyelet that is connected to the fishing line. The hook stabilizing device is located within the lure body and defines a first end and a second end. The hook stabilizing device also defines a star-shaped aperture extending from the first end to the second end. The star-shaped aperture accepts the fishing line through the first end and accepts the eyelet of the hook through the second end such that the connection of the fishing line to the eyelet is housed within the star-shaped aperture between the first end and the second end to substantially prevent the hook from rotating when contained within the star-shaped aperture.

Additional objects and advantages of the present subject matter are set forth in, or will be apparent to, those of ordinary skill in the art from the detailed description herein. Also, it should be further appreciated that modifications and variations to the specifically illustrated, referred and discussed features and elements hereof may be practiced in various embodiments and uses of the invention without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures).

Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present invention, including the best mode thereof, directed to one of ordinary skill in the art, is set forth in the specification, which includes and makes reference to the appended figures, in which:

FIG. 1 is a perspective view of a fishing squid-like lure incorporating an embodiment of the hook stabilizing device of the present invention;

FIG. 2 is a perspective view of another embodiment of the present invention;

FIG. 3 is a perspective view of yet another embodiment of the present invention when the hook stabilizing device is up the fishing line away from the hook;

FIG. 4A is an exploded view of an exemplary embodiment of the hook stabilizing device of the present invention;

FIG. 4B is a cutaway view of an embodiment of the present invention;

FIG. 5 is a cross sectional view of one embodiment of the present invention.

FIG. 6 is a perspective view of another embodiment of a fishing lure of the present invention;

FIG. 7 is a perspective view of the embodiment of a fishing lure incorporating another exemplary hook stabilizing device of the present invention;

Figure 8A:
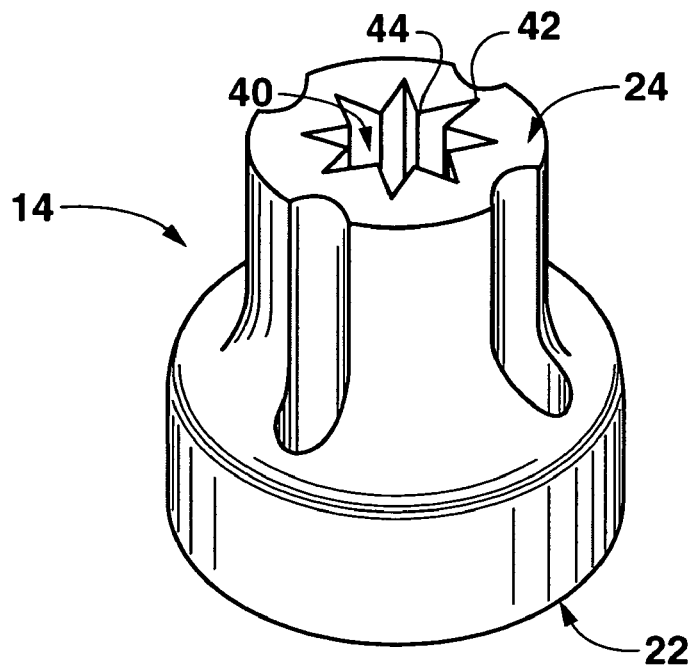
FIG. 8A is an exploded view of an exemplary embodiment of the hook stabilizing device of the present invention.

Repeat use of reference characters throughout the present specification and appended drawings is intended to represent the same or analogous features or elements of the invention.

DETAILED DESCRIPTION

The present application generally provides for a fishing lure incorporating a hook stabilizing device that prevents the hook from rotating relative to the lure while being fished but can still allow the hook to rotate freely when fighting a hooked fish. In order to fully understand the advantages of the present disclosure, FIGS. 1–8 will be explained in greater detail as exemplary embodiments of the present invention. Each example is provided by way of an explanation of the invention and not meant as a limitation of the invention. For example, features illustrated or described as part of one embodiment may be used for another embodiment to yield still a further embodiment. In fact, it will be apparent to those skilled in the art that various modifications and variations can be made in the present invention without departing from the scope or spirit of the invention.

Referring to FIGS. 1 and 2, an exemplary embodiment of a fishing lure 10 according to the present invention is illustrated. Fishing lure 10 is shown comprising lure body 12 and hook stabilizing device or member 14. Hook stabilizing device 14 is shown to be an internal member hidden within lure body 12 and designed to encompass a connection of eyelet 16 of hook 18 to leader line 20. As used herein, "leader line" describes the fishing line segment that attaches to the lure or hook. The leader line may be a separate fishing line, typically stronger than the regular line on the fishing reel, or may simply be a portion of the fishing line attached to the fishing reel.

Hook stabilizing device 14 is shaped to prevent hook 18 from rotating while lure 10 is being fished. Preventing hook 18 from rotating with respect to lure 10 is advantageous while the lure 10 is being fished to prevent the hook from excessive movement that may discourage a targeted fish from striking the lure. Also, by preventing the hook 18 from rotating freely with respect to the lure, the hook 18 can stay in the desired position and angle to better ensure that a striking fish will be hooked and/or that the lure is less susceptible to hooking the body of water's bottom surface or unwanted debris found in the water, such as aquatic plants, rocks, logs, etc. Also, in the exemplary embodiments shown, the hook 18 is connected directly to leader line 20 at crimp 21; thus, preventing hook 18 from rotating will prevent the build-up of twist in the leader line 20.

However, when fighting a hooked fish, the angler may desire hook 18 to rotate freely and for lure body 12 to move up leader line 20 away from hook 18. As such, lure body 12 will not dislodge hook 18 out of a hooked fish's mouth and will be allowed to rotate freely with the hooked fish. According to the present disclosure, when a fish strikes lure 10 and is hooked by hook 18, the pressure asserted by the fish can pull eyelet 16 or hook 18 out of hook stabilizing device 14, as shown in FIG. 3. Thus, while fighting a hooked fish, hook 18 can rotate with the hooked fish.

As best seen in the exemplary embodiments of FIGS. 4A, 4B, and 5, hook stabilizing device 14 defines a first end 22 and a second end 24. First end 22 defines an aperture 26 configured to receive the leader line 20. Generally, aperture 26 has a hollow, cylindrical tube shape, the size of which can vary according to the diameter of the inserted leader line 20.

In the exemplary embodiment shown, the intersecting slots or grooves 28 and 30 defined by second end 24 of hook stabilizing device 14 taper in both size and shape to become the aperture 26 defined by the first end 22. Also, as shown, the intersecting slots 28 and 30 extend at least about two-thirds of the length of the hook stabilizing device 14. However, the length of intersecting slots 28 and 30 can vary according to the particular application of lure 10. In fact, the relative length of intersecting slots 28 and 30 to hook stabilizing device 14 is not critical, as long as intersecting slots 28 and 30 are deep and long enough to accept eyelet 16 and crimp 21 to prevent hook 18 from substantially rotating with respect to lure body 12.

As stated, the second end 24 of hook stabilizing device 14 also defines a first intersecting slot 28 and a second intersecting slot 30. As shown in FIGS. 4A and B, the intersecting slots 28 and 30 extend through the hook stabilizing device 14 to connect to the first aperture 26 located on the second end 24. The pair of intersecting slots 28 and 30 are shown in the exemplary embodiments of FIGS. 4A, 4B and 5 to form a cross-like shape on second end 24 of stabilizing device 14. However, any shape can be used that can effectively receive the eyelet 16 of hook 18 and crimp 21 of leader line 20 and prevent the eyelet from rotating with respect to the lure body 12. In the exemplary embodiment shown in FIG. 5, the cross-like aperture formed by intersecting slots 28 and 30 is capable of receiving both the eyelet 16 of hook 18 and the crimp 21 used to attach leader line 20 to eyelet 18.

The exemplary embodiments of FIGS. 1-3 show hook 18 attached to leader line 20 at eyelet 16 by the use of crimp 21. However, any method of attaching leader line 20 to hook 18 can be employed within the scope of the present disclosure. For example, in other embodiments, leader line 20 can be tied onto hook 18 at eyelet 16. In this embodiment, slots 26 and 28 can be configured to accept the knot formed at or on eyelet 16 or shaft 38 of hook 18 as well as eyelet 16 itself to prevent hook 18 from substantially rotating with respect to lure body 12.

In the exemplary embodiment depicted in FIGS. 1-5, hook stabilizing device 14 is depicted as a tubular, oval shaped structure. However, any external shape can be utilized so long as the apertures defined by the first and second ends are capable of preventing the hook 18 from rotating with respect to lure body 12. Also, in the exemplary embodiments of FIGS. 1-4A, hook stabilizing device 14 is shown with decorative extrusions 32 that define decorative eye features 34 for lure 12. However, the decorative eye features 34 are optional and in some embodiments may not be present on hook stabilizing device 14, for instance as shown in FIGS. 4B and 5. Other decorative designs and extrusions can be included on the exterior of hook stabilizing device 14 without affecting its intended function.

Hook stabilizing device 14 can be composed of any material that is capable of being formed or configured into the desired shape. For example, in the embodiment depicted in FIG. 1, the stabilizing device 14 can be a lightweight, plastic-like material. However, in other embodiments, such as in the embodiment depicted in FIG. 2, hook stabilizing device 14 can be a metal so that hook stabilizing device 14 doubles in function to also provide weight to lure 10. In other embodiments, hook stabilizing device 14 can define a portion of lure body 12 such that hook stabilizing device 14 is essentially a part of lure body 12.

In the exemplary embodiment of FIG. 1, lure body 12 is shaped to resemble a squid-like bait. However, as shown in the exemplary embodiment of FIG. 2, lure body 12 can take the shape of a bait fish. In fact, lure body 12 can be shaped into any form desired, including squid-like baits, bait fish, and other sea or aquatic creatures.

Another embodiment of fishing lure 10 is depicted in FIGS. 6 and 7. Lure 10 has a head 50 and a skirt 52. The leader line 20 enters the lure body 10 at the head 50 and is attached to hook 18 at the eyelet 16. Within lure body 10, hook stabilizing device 14 is shown located at the junction of lure head 50 and skirt 52. The hook stabilizing device 14 is hidden inside the lure skirt 52.

Figure 8B:
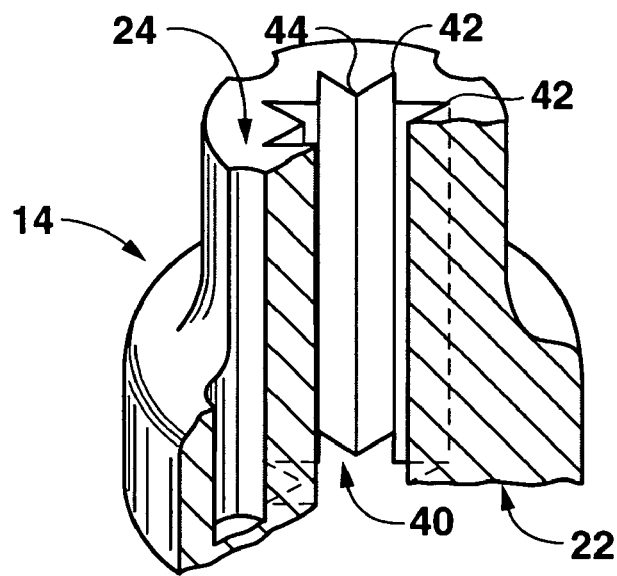
FIG. 8B is a cutaway view of the hook stabilizing device of FIG. 8A.
Figure 8C:
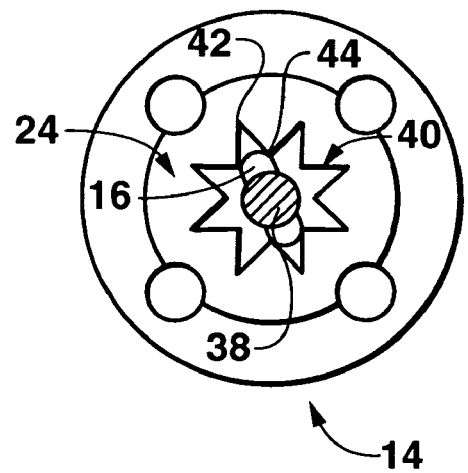
FIG. 8C is an overhead view of the hook stabilizing device of FIG. 8A.

As better shown in the exemplary embodiment of FIGS. 8a-8c, hook stabilizing device 14 defines a first end 22 and a second end 24. The hook stabilizing device also defines a star-shaped aperture 40 extending the length of the hook stabilizing device 14 from first end 22 to second end 24.

Star-shaped aperture 40 is shown defining 8 outer points 42 and 8 inner points 44. However, any number of outer and inner points may be present on the star-shaped aperture. Due to the geometry of the star-shaped aperture, the number of outer points 42 and inner points 44 is identical in most embodiments. For example, the star-shaped aperture 40 can define at least 4 outer points 42 and at least 4 inner points 44. For example, in one embodiment, the star-shaped aperture can define at least 6 outer points 42 and can define at least 6 inner points 44.

The star-shaped aperture 40 is shown to be symmetrical in any plane defined from opposite points of the star-shaped aperture. However, in other embodiments, the star-shaped aperture may not be symmetrical in any plane. For example, the star-shaped aperture 40 can have different diameters extending to each outer point 42 from the center of the star-shaped aperture.

As best shown in FIG. 8c, hook eyelet 16 enters the star-shaped aperture 40 through second end 24 of the hook stabilizing device 14. The star-shaped aperture is configured to hinder, and even prevent, rotation of the hook eyelet 16, and thus hook shaft 38 and hook 18, from rotating freely. Preferably, the hook eyelet 16 fits tightly between consecutive inner points 44 so the hook eyelet 16 remains stable while within the star-shaped aperture 40.

When fighting a fish, the hook 18 can be pulled out of the hook stabilizing device 14 through the second end 24 allowing the hook eyelet 16 to rotate freely with the movement of the fish.

The star-shaped aperture 40 is shown to be substantially the same size and shape throughout the hook stabilizing device 14 from the first end 22 to the second end 24. However, in other embodiments, the size and shape of the star-shaped aperture 40 can change throughout the length of the hook stabilizing device 14. For instance, in one embodiment, the star-shaped aperture 40 can taper from the second end 24 to the first end 22. For instance, the star-shaped aperture 40 can taper from the second end 24 to form a circular aperture for receipt of the leader line 20 at the first end 22 (much like the embodiments shown in FIGS. 1-5).

As shown in FIG. 8a, hook stabilizing device 14 has an outer cylinder-like shape that tapers from first end 22 toward second end 24. However, any outer shape of hook stabilizing device 14 can be used in accordance with the present invention. Also, the hook stabilizing device 14 can be made of any material, including but not limited to, plastic, rubber, metal, and the like.

Hook 18 is shown in the exemplary embodiments of FIGS. 1-3 and 6-7 as being a single hook comprising hook bend 36, hook shaft 38, and hook eyelet 16. In other embodiments, hook 18 can be comprised of more than one hook bend 36, such as a double or treble hook. Also, hook 18 can take the shape of any conventional hook that is typically used while fishing. Finally, the size of hook 18 can vary according to the particular application and fish targeted.

While the present subject matter has been described in detail with respect to specific embodiments thereof, it will be appreciated that those skilled in the art, upon attaining and understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. A fishing lure rig assembly attached to a leader line, comprising:
   a hook defining an eyelet, said eyelet connected to the leader line;
   a structural member defining a first end and a second end, said structural member defining a star-shaped aperture extending through said structural member from said first end to said second end, said star-shaped aperture hindering said eyelet connected to said leader line from rotating freely; and
   a lure body substantially surrounding said structural member.

2. A fishing lure rig assembly as in claim 1, wherein said star-shaped aperture defines at least 4 outer points.

3. A fishing lure rig assembly as in claim 2, wherein said star-shaped aperture defines at least 4 inner points, such that the star-shaped aperture defines an equal number of said outer points and said inner points.

4. A fishing lure rig assembly as in claim 1, wherein said star-shaped aperture is symmetrical throughout said structural member.

5. A fishing lure rig assembly as in claim 1, wherein said star-shaped aperture defines 8 outer points.

6. The fishing lure rig assembly of claim 1, wherein said eyelet of said hook fits tightly within said star-shaped aperture.

7. A fishing lure configured for connection to a fishing line, comprising:
   a lure body defining a head section where the fishing line enters said lure body;
   a hook defining an eyelet, wherein said eyelet is connected to the fishing line at a connection; and
   a hook stabilizing device located within said lure body and defining a first end and a second end, said hook stabilizing device defining a star-shaped aperture extending from said first end to said second end, said star-shaped aperture accepting the fishing line through said first end and accepting said eyelet through said second end such that the connection of the fishing line to said eyelet is housed within said star-shaped aperture between said first end and said second end to substantially prevent said hook from rotating when contained within said star-shaped aperture.

8. A fishing lure as in claim 7, wherein said star-shaped aperture defines at least 4 outer points.

9. A fishing lure as in claim 7, wherein said star-shaped aperture defines 8 outer points.

10. A fishing lure as in claim 9, wherein said star-shaped aperture defines 8 inner points.

11. A fishing lure as in claim 7, wherein said eyelet of said hook fits snugly within said star-shaped aperture.

12. A fishing lure as in claim 7, wherein said eyelet of said hook is capable of being pulled out of said star-shaped aperture when hooked to a fish.

13. A fishing lure as in claim 7, wherein said star-shaped aperture is symmetrical.

14. A fishing lure as in claim 7, wherein said star-shaped aperture is the same size and shape through said hook stabilizing device from said first end to said second end.

* * * * *